United States Patent
Markel et al.

(10) Patent No.: US 10,148,670 B2
(45) Date of Patent: Dec. 4, 2018

(54) MOVEMENT-BASED EVENT DETECTION IN A MOBILE DEVICE

(71) Applicant: Avago Technologies International Sales Pte. Limited, Singapore (SG)

(72) Inventors: Shlomo Markel, Haifa (IL); Jacob Mendel, Givat Brenner (IL)

(73) Assignee: Avago Technologies International Sales Pte. Limited., Singapore (SG)

( * ) Notice: Subject to any disclaimer, the term of this patent is extended or adjusted under 35 U.S.C. 154(b) by 145 days.

(21) Appl. No.: 13/730,267

(22) Filed: Dec. 28, 2012

(65) Prior Publication Data

US 2014/0082713 A1  Mar. 20, 2014

Related U.S. Application Data

(60) Provisional application No. 61/702,712, filed on Sep. 18, 2012.

(51) Int. Cl.
*H04L 29/00* (2006.01)
*H04L 29/06* (2006.01)

(52) U.S. Cl.
CPC .............. *H04L 63/12* (2013.01); *H04L 63/08* (2013.01); *H04L 63/105* (2013.01)

(58) Field of Classification Search
CPC ........... H04W 4/22; H04W 4/23; H04W 4/26; H04W 4/27; H04W 4/46; H04L 63/08;
(Continued)

(56) References Cited

U.S. PATENT DOCUMENTS

| 8,301,684 B2 | 10/2012 | Mitchell et al. |
| 8,307,071 B2 | 11/2012 | Donnelly et al. |

(Continued)

FOREIGN PATENT DOCUMENTS

| CN | 1688953 A | 10/2005 |
| CN | 102317903 A | 1/2012 |

(Continued)

OTHER PUBLICATIONS

"WreckWatch: Automatic Traffic Accident Detection and Notification with Smartphones", by White et al., Springer Science Business Media, pp. 285-303, published online on Mar. 22, 2011.*

(Continued)

*Primary Examiner* — Noura Zoubair
(74) *Attorney, Agent, or Firm* — Sterne, Kessler, Goldstein & Fox P.L.L.C.

(57) ABSTRACT

Systems and methods are provided for enhancing security by providing additional authentication factors. Prior to authentication, a user may enroll a device from which access to a service or application is authorized. During authentication, the authentication system may retrieve the location of the enrolled device and generate one or more questions that only a user in that location can answer. The user may additionally or alternatively enroll a movement signature with an authentication server as an authentication factor. The user may set a pattern for device movement. During authentication, the user moves the device in the pattern. The device then transmits the movement signature for authentication.

20 Claims, 5 Drawing Sheets

(58) Field of Classification Search
CPC ......... H04L 63/12; H04L 63/105; G06F 3/03; G06F 3/017; G06F 3/0346
USPC .......... 455/404.1, 404.2, 566, 567; 340/539; 726/4, 7
See application file for complete search history.

(56) References Cited

U.S. PATENT DOCUMENTS

| | | |
|---|---|---|
| 8,910,251 B2 | 12/2014 | Shepard et al. |
| 2004/0088587 A1 | 5/2004 | Ramaswamy et al. |
| 2007/0112968 A1 | 5/2007 | Schwab |
| 2008/0020733 A1* | 1/2008 | Wassingbo .................... 455/411 |
| 2010/0218111 A1 | 8/2010 | Mitchell et al. |
| 2012/0124662 A1* | 5/2012 | Baca ....................... G06F 21/32 726/17 |
| 2012/0164968 A1* | 6/2012 | Velusamy et al. ......... 455/404.2 |
| 2012/0302200 A1* | 11/2012 | Esbensen .................. 455/404.2 |

FOREIGN PATENT DOCUMENTS

| | | |
|---|---|---|
| CN | 102405474 A | 4/2012 |
| EP | 2431904 A1 | 3/2012 |
| TW | 200625905 A | 7/2006 |
| TW | 201140335 A1 | 11/2011 |
| WO | WO 01/90859 A1 | 11/2001 |

OTHER PUBLICATIONS

Partial European Search Report dated Dec. 13, 2013, for European Application No. EP 13 00 4282, 5 pages.
Office Action directed to related Taiwanese Patent Application No. 102132421, dated Feb. 4, 2015; 7 pages.
English-Language Abstract for Taiwanese Patent Publication No. 200625905 A, published Jul. 16, 2006; 1 page.
Chinese Office Action, directed to related Chinese Patent Application No. 201310385038 dated Apr. 1, 2016; 7 pages.
European Search Report directed to related European Patent Application No. 13004282.3, dated Apr. 24, 2014; 5 pages.

* cited by examiner

MOVEMENT-BASED EVENT DETECTION IN A MOBILE DEVICE

CROSS REFERENCE TO RELATED APPLICATIONS

This application claims the benefit under 35 U.S.C. § 119(e) of U.S. Provisional Application No. 61/702,712 filed on Sep. 18, 2012, which is hereby incorporated by reference in its entirety.

FIELD

The embodiments are generally directed to computer security and in particular to authentication systems.

BACKGROUND

Many network-based services or applications require a user to authenticate himself or herself prior to being granted access to the service or application. Systems for authenticating users typically rely on authentication factors including something the user has (e.g., a card), something the user knows (e.g., a password) or something the user is (e.g. a fingerprint). Many current services and applications utilize two-factors for authentication. That is, the user must provide two credentials during the authentication process. However, many forms of two-factor authentication do not provide an acceptable level of security for certain service or applications. Therefore, a need exists to increase the security and likewise increase the effort required to defeat security by unauthorized users.

BRIEF DESCRIPTION OF THE DRAWINGS/FIGURES

Figure 1:
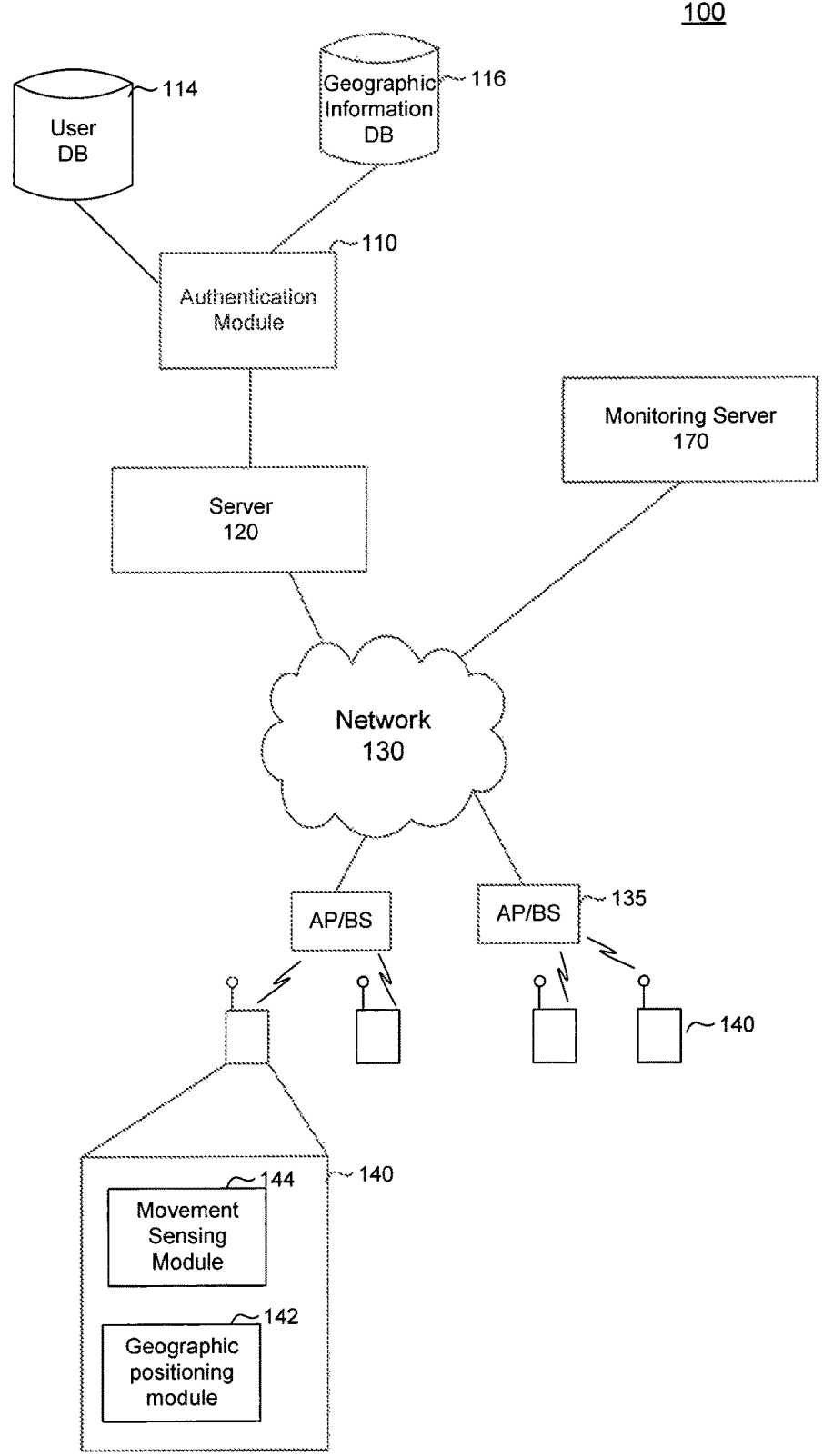
FIG. 1 depicts a system diagram of an example network environment including a location-based authentication system, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Systems and methods are provided for enhancing security by providing additional authentication factors. The availability of location information for a user provides additional data that can be utilized to increase the security of an application. For example, a system may receive location information for a mobile device associated with the user attempting to access a service or application. In response, the system can send the user a series of questions based on where the authorized mobile device is located. If the user is accessing the service or application from an unauthorized device, that user will not be in a position to answer these questions. These questions are designed so that only an individual having access to the authorized mobile device for the user can answer the question correctly. Another potential dimension of unique authentication may involve movement of the device by a user. A user may set-up a movement pattern as an additional authentication factor. When the user performs the movement, the mobile device can send a movement signature for authentication. The authentication server compares the received signature to an expected signature for that user.

FIG. 1 is a block diagram of an exemplary environment 100 including an authentication system, according to embodiments of the disclosure. Environment 100 includes server 120, communications network 130, and one or more mobile devices 140.

Mobile device 140 may be any computing device that provides network connectivity including, but not limited to, a mobile phone, tablet computer, laptop computer, navigation system, etc. In an embodiment, a service or application may associate a user with a specific device or set of devices 140. In this embodiment, authentication is tied to the location of the enrolled device(s) for a user. To support this embodiment, mobile device 140 may include location module 142. Location module 142, for example, includes software, hardware, or a combination thereof, configured to determine or estimate the geographical location of the device. The location services may include or make use of a Global Positioning System (GPS) receiver or a GPS navigation system.

In an additional or alternative embodiment, a service or application may assign a movement pattern to a device as an additional authentication factor for the user. The movement pattern may be set by the service or application or alternatively may be selected by the user and enrolled as additional authentication criteria for the user. To support this embodiment, a mobile device 140 may also include movement sensing module 144. Movement sensing module 144 is configured to sense the mobile device's position, orientation or velocity. For example, mobile device 140 may contain an accelerometer, a gyroscope, an infrared sensor, etc., and/or any combination thereof. The movement sensing module 144 is further configured to capture movement or criteria indicative of movement and convert the movements into a movement signature.

In an additional or alternative embodiment, mobile device 140 may further support event monitoring. In this embodiment, mobile device 140 stores one or more movement patterns indicative of an event. For example, a business may provide employees with a movement pattern to use in emergency situations such as a robbery. In a further example, mobile device 140 may store one or more patterns or criteria indicative of device movement during events such as an automobile accident. To support the embodiment, movement sensing module 144 monitors for one of the predefined patterns or criteria. When detected, movement sensing module 144 is configured to send notification to monitoring server 170.

Mobile device 140 connects to network 130 via an access point. Access point 135 may be any network access point. In an embodiment, access point 135 may be a wireless network access point or base station. As would be appreciated by persons of ordinary skill in the art, device 140 can communicate with an access point using any protocol including, but not limited to, WiFi, CDMA, TDMA, GSM, or the like.

Server 120 is configured to host all or a portion of an application or service offered to users. Users attempting to gain access to a service or application communicate with server 120. Authentication module 110 is configured to provide authentication of a user and/or user device on behalf of an application or service offered by server 120 or another server (not shown). Authentication module 110 may be included in server 120 or may be a separate device or module in the network.

In an embodiment, authentication module 110 is configured to provide location-based authentication of a user for an application or service. In this embodiment, authentication module 110 is configured to determine the location of a device enrolled for the user requesting access to a service or application. Using the enrolled device location, authentication module 110 retrieves one or more questions for a user based on the location of the enrolled device. Alternatively, authentication module 110 may retrieve information about the location of the mobile device and form a location-based authentication question. When an additional authentication factor is required, authentication module 110 transmits the location-based authentication question to the user.

In an additional or alternative embodiment, authentication module is configured to provide movement-based authentication of a user for an application or service. In this embodiment, when an additional authentication factor is required, authentication module 110 requests that the user perform an authentication movement. The authentication module receives a movement signature from the user's device and compares the received movement against a stored movement signature for the user.

Authentication module 110 is coupled to a user database 114 and a geographic information database 116. For example, user database 114 may include identification information for a device or devices enrolled for a user. The stored credentials for a user may include a password, a biometric (e.g., fingerprint), or a movement signature. Each of these credentials would be enrolled in advance by the user of the service or application. A service or application may define the number and type of authentication criteria to request when accessing a service.

Geographic information database 116 is configured to store information regarding specific locations. For example, geographic information database 116 may store a set of questions for a location. Alternatively, geographic information database 116 may store a set of general information about a location. Authentication module 110 (or geographic information database 116) may be configured to generate a question or set of questions using the stored general information about the location.

Server 120 and authentication module 110 are coupled to one or more user devices 140 through network 130. Network 130 may be any communications network or combination of networks over which a device can transmit data. By way of example, network 130 may comprise a public data communications network such as the Internet, the public switched telephone network (PSTN), a wireless network, local area network, wide area network, etc., a private communications network, and/or any combination thereof.

Monitoring server 170 is configured to take action based on a condition or event detected by a mobile device 140. For example, monitoring server 170 includes a set of response protocols to apply to each detection condition or event. For example, the event is a robbery or similar event, monitoring server 170 can notify security personnel and/or direct cameras to monitor the area containing the mobile phone detecting the condition or event. If the detected event is an automobile accident, monitoring server 170 may be configured to first confirm with the mobile device user and then take action based on the confirmation response (or lack of response). As would be appreciated by persons skilled in the art, an organization (such as a bank, school, or government entity) can define conditions, movement patterns to indicate the condition, and actions responsive to the specified conditions.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 2:
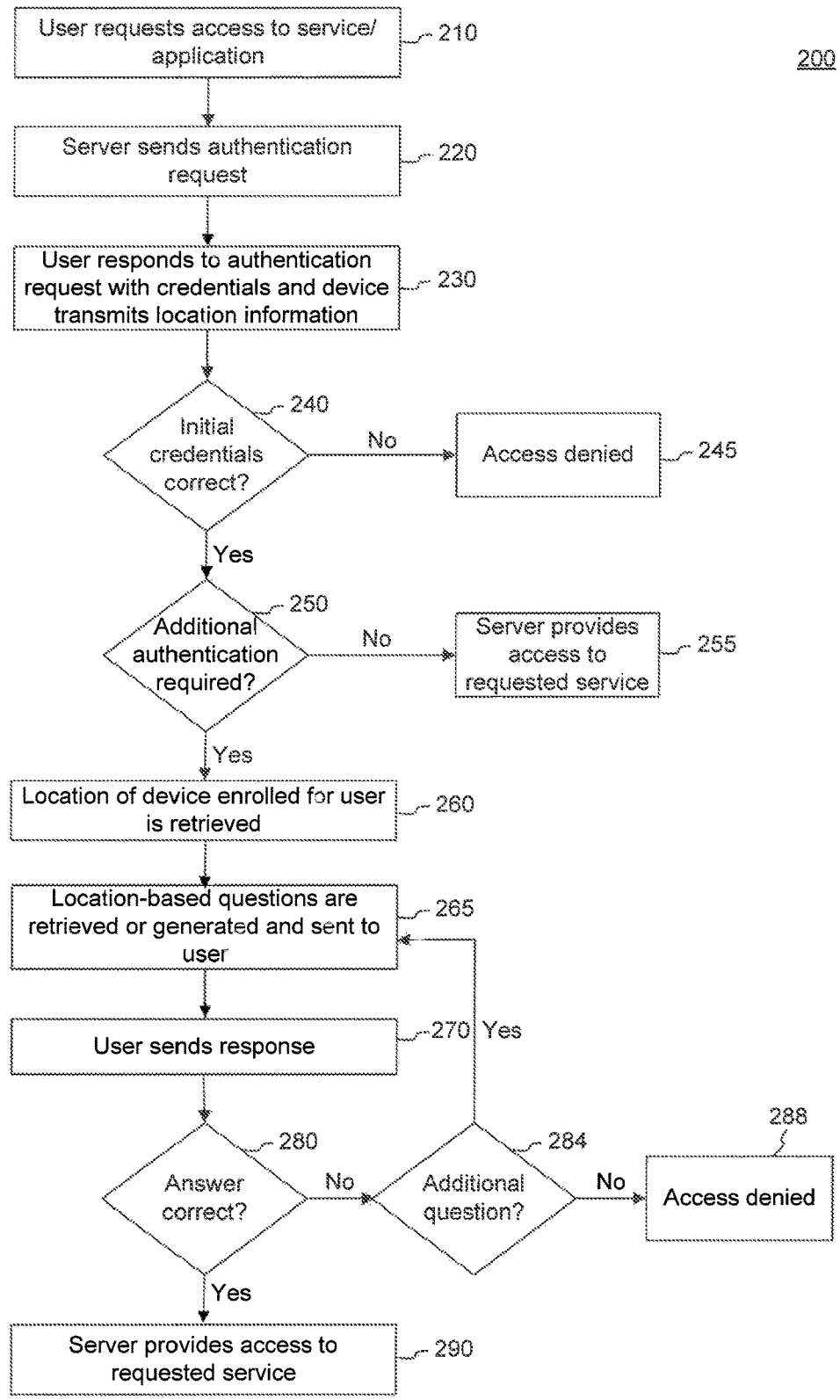
FIG. 2 depicts a flowchart of an exemplary method for authenticating a user using the location of the user's device, in accordance with an embodiment.

FIG. 2 depicts a flowchart 200 of an exemplary method for authenticating a user using the location of the user's device, in accordance with an embodiment. For applications or services requiring additional security, an authentication system can introduce an additional factor of authentication using device location information. For example, the current location for a device enrolled for the user is obtained. Based on the location, one or more location-based questions are used to confirm that the party requesting authentication has possession of the enrolled device in its current known location. For example, the system may ask the user "what color is the door at 345 Maple Street?" or "what store is on the corner of D and $11^{th}$ Street?" If a party is attempting to access the service or application from an unauthorized device, the party will not be in a position to correctly answer these questions. Flowchart 200 is described with continued reference to the embodiment described in FIG. 1. However, flowchart 200 is not limited to that embodiment.

At step 210, a user attempts to access a service or application.

At step 220, an authentication module associated with the requested service or application sends an authentication message to user's device. The authentication message requests one or more authentication credentials such as a username, a password, etc.

At step 230, the user enters the requested authentication credentials and the credentials are transmitted to the authentication module.

At step 240, the authentication module verifies the received user credentials against the credentials stored for the user. If the credentials do not match, the process proceeds to step 245 where access to the requested service or application is denied. If the credentials match, the process moves to step 250.

At step 250, the authentication module determines whether additional authentication is required. The authentication module may be configured to require additional authentication based on any factor or factors such as, for example, the type of service the user is trying to access or the particular user requesting access. If no additional authentication is required, the process proceeds to step 255 and access to the requested service or application is granted. If additional authentication is required, the process proceeds to step 260.

At step 260, the authentication module retrieves current location data for the device enrolled for the user. In an embodiment, a user or a service may enroll a device. This device is the device expected to be used to access the service or application. For example, in this embodiment, the authentication module may use the received credentials to access information including identification data for the device associated with the user's credentials. The authentication module then uses device identification data to request current location data for the device from the serving network or directly from the device.

At step 265, an authentication question is retrieved for the location of the user device. In an embodiment, the authentication question is based on street level detail for the location where the device associated with the legitimate user is currently residing. For example, the question may inquire as to what stores, monuments or landmarks are located nearby, the color of features such as doors on specific buildings are, etc. In an embodiment, geographic information database 116 stores questions associated with particular locations for retrieval by the authentication module. Alternatively, geographic information database 116 or authentication module 110 generates questions based on location information stored in geographic information database 116.

At step 270, the retrieved question is forwarded to the user.

At step 275, the user is prompted for a response to the authentication question by, for example, displaying the question on the display. The user enters a response and the response is transmitted to the authentication module.

At step 280, the authentication module determines whether the received answer is correct. If the answer is correct, operation proceeds to step 290 where access to the service or application is granted. If the answer is not correct, operation proceeds to step 284.

At step 284, a determination is made whether an additional authentication question should be provided to the user. The number of attempts allowed for a user can be a configurable setting. By way of example, the number of attempts can be configured to depend on the service or application being requested, on the particular user requesting access, on the level of security desired, etc. Those skilled in the relevant art(s) will recognize other factors to consider in determining the number of attempts to permit. If an additional question is provided, operation returns to step 265. If no additional request is provided, operation proceeds to step 288 where access to the service or application is denied.

Figure 3:
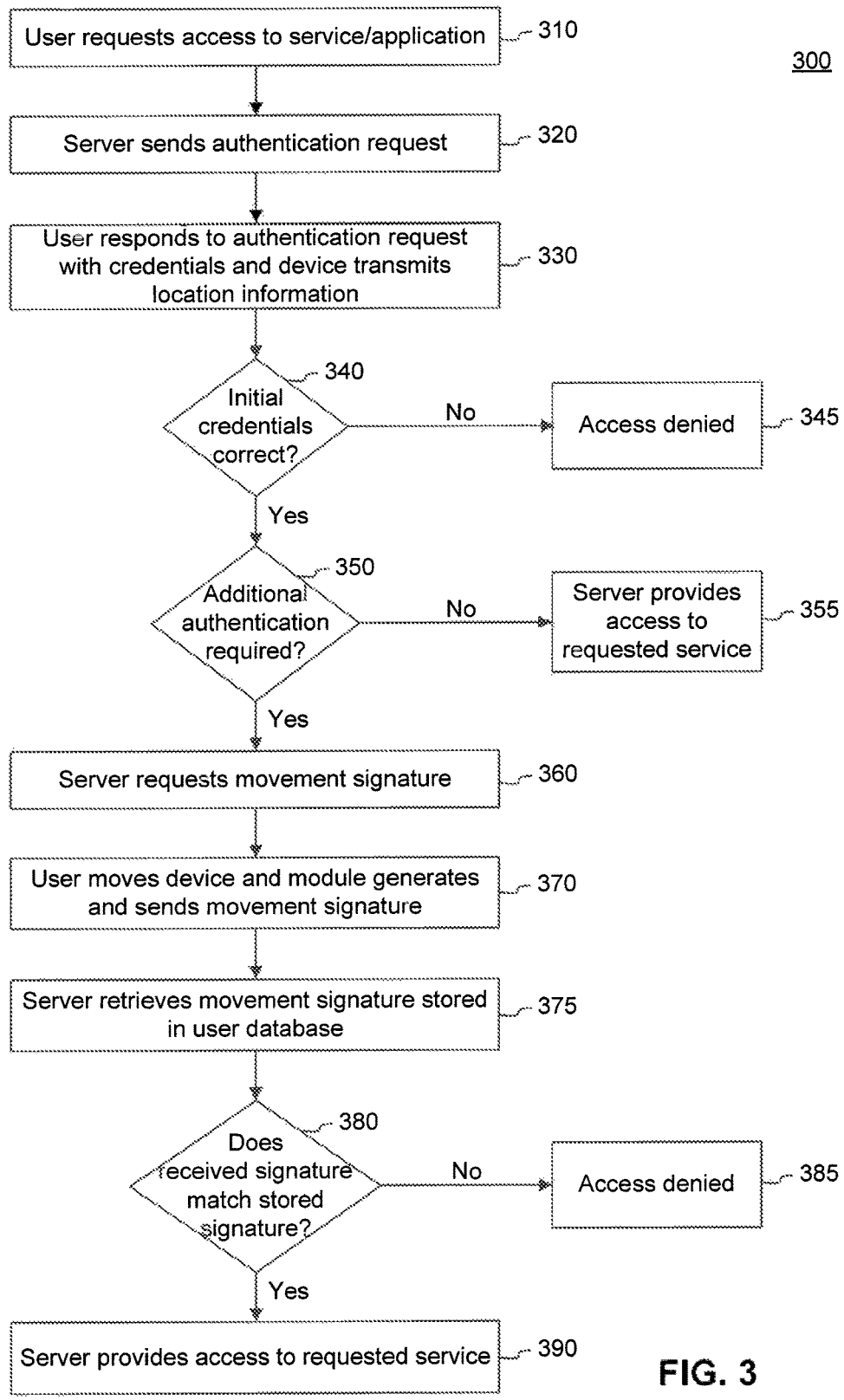
FIG. 3 depicts a flowchart of an exemplary method for authenticating a user using movement of a mobile device as an additional authentication factor, in accordance with an embodiment.

FIG. 3 depicts a flowchart 300 of an exemplary method for authenticating a user using movement of a mobile device as an additional authentication factor, in accordance with an embodiment. Flowchart 300 is described with continued reference to the embodiment described in FIG. 1. However, flowchart 300 is not limited to that embodiment.

Prior to step 310, the legitimate user enrolls a movement signature as an additional authentication factor with the service or application. By way of example, the user may rotate, shake, turn or otherwise move the phone in any pattern. This movement is used to generate a movement signature that is stored in a database with the credentials for the legitimate user.

At step 310, a user attempts to access a service or application.

At step 320, an authentication module associated with the requested service or application sends an authentication message to user's device. The authentication message requests one or more authentication credentials such as a username, a password, etc.

At step 330, the user enters the requested authentication credentials and the credentials are transmitted to the authentication module.

At step 340, the authentication module verifies the received user credentials against the credentials stored for the user. If the credentials do not match, the process proceeds to step 345 where access to the requested service or application is denied. If the credentials match, the process moves to step 350.

At step 350, the authentication module determines if additional authentication is required. The authentication module may be configured to require additional authentication based on any factor or factors such as, for example, the type of service the user is trying to access or the particular user requesting access. If no additional authentication is required, the process proceeds to step 355 and access to the requested service or application is granted. If additional authentication is required, the process proceeds to step 360.

At step 360, the authentication module sends a request for a movement signature.

At step 370, the user moves the mobile device in a pattern. The mobile device monitors the movement and generates a movement signature.

At step 375, the movement signature is received at the authentication module. The authentication module then retrieves the stored signature associated with the user.

At step 380, if the received movement signature matches the stored movement signature, operation proceeds to step 390 where access to service or application is granted. Otherwise, operation proceeds to step 385 where access is denied.

In addition to use as an additional authentication factor, movement of a mobile device can be used to indicate a specific condition has occurred. A mobile device can be configured with event detection capabilities in which it monitors for particular movements and responds by triggering an event response. In an embodiment, a mobile device can be configured to enable a user to report an emergency condition by moving the device in a predetermined pattern. For example, a bank can provide tellers with phones having event detection capabilities. If a robbery or other emergency condition is taking place, the bank teller can move the phone in a pattern that triggers emergency assistance action. In addition or alternatively, the mobile device can be configured to detect movement indicative of an automobile accident such as a very rapid deceleration of the device or flipping in a particular manner.

Figure 4:
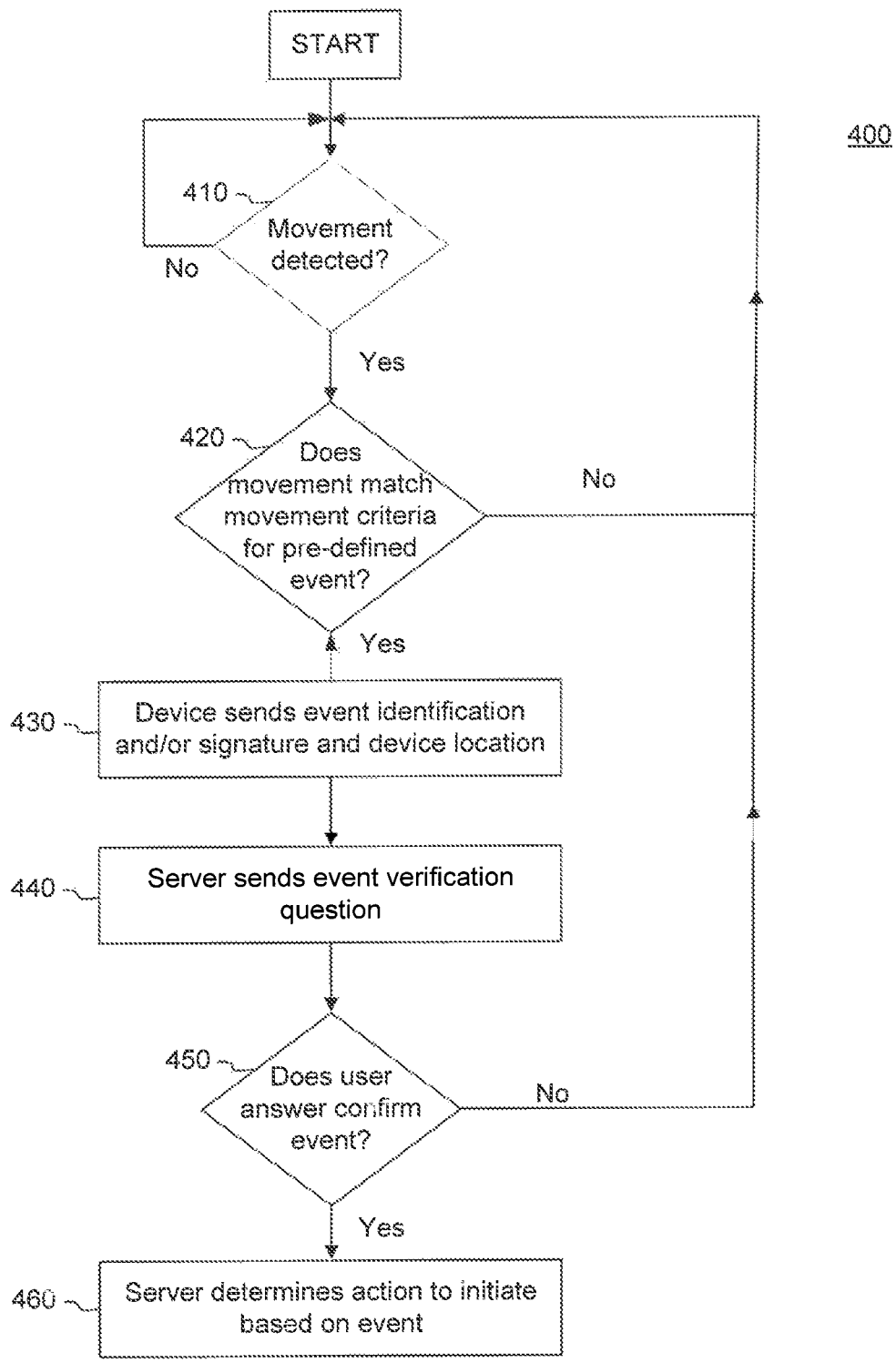
FIG. 4 depicts a flowchart of an exemplary method 400 of detecting an event based on a movement of a mobile device, in accordance with an embodiment.

FIG. 4 depicts a flowchart 400 of an exemplary method 400 of detecting an event based on a movement of a mobile device, in accordance with an embodiment. Flowchart 400 is described with continued reference to the embodiment described in FIG. 1. However, flowchart 400 is not limited to that embodiment.

Prior to step 410, a mobile device is configured with event detection functionality. In addition, signatures or criteria for specific movements and their associated condition indicators are entered into mobile device. In embodiments, event detection functionality can be turned on or off.

At step 410, the mobile device monitors for a device movement.

At step 420, mobile device determines whether the movement matches movement criteria or signatures stored in the device. If the detected movement matches a stored criteria or signature, operation proceeds to step 430. If the detected movement does not match stored criteria, operation returns to step 410.

At step 430, the device may associate a condition type with the detected event (e.g., a potential robbery may be assigned a first code whereas an automobile accident may be assigned a second code). In this step, the condition type code and/or condition signature or criteria are transmitted to a monitoring server 102. The device may further transmit its location.

At step 440, monitoring server may confirm the reported condition by sending an event verification question. This step is optional. When not present, operation proceeds from step 430 to step 460.

At step 450, monitoring server determines if the user confirmed the event. If the event is not confirmed, the process returns to step 410, where the mobile device monitors for movement. This step is also optional and will only be present if step 450 is performed.

For example, if an automobile accident event is detected, monitoring server, through the mobile device, asks the user to confirm that an accident has actually occurred. If the user responds affirmatively, or if the user does not respond, authentication server can decide to deploy emergency assistance. But if the user responds that no accident has occurred, processing of the detected condition can end. As discussed above, in an embodiment, the monitoring server does not perform the event confirmation steps of 440 and 450 for some types of events where the user cannot confirm the event without compromising the user's security (e.g., a robbery).

At step 460, monitoring server initiates one or more actions in response to the detected and reported condition. For example, if the detected condition is an automobile accident, monitoring server can notify emergency personnel of the accident and direct them to the location of the mobile device. In another example, if the event is a robbery or similar event, monitoring server can notify security personnel and/or direct cameras to monitor the area containing the mobile phone. As would be appreciated by persons skilled in the art, an organization (such as a bank, school, or government entity) can define conditions, movement patterns to indicate the condition, and actions responsive to the specified conditions.

Figure 5:
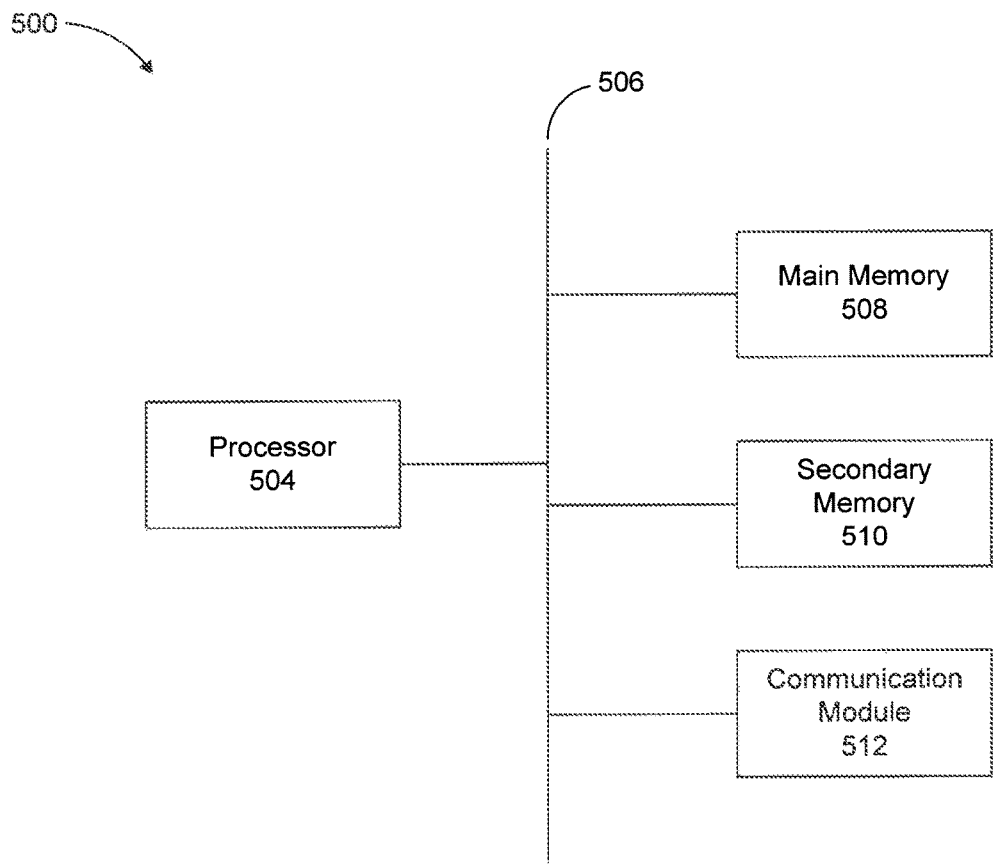
FIG. 5 depicts an exemplary processing system, according to an embodiment.

Various aspects of the present disclosure can be implemented by software, firmware, hardware, or a combination thereof. FIG. 5 illustrates an exemplary processing system 500 in which exemplary embodiments of the present disclosure, or portions thereof, can be implemented as processor-executable code. For example, the methods illustrated by flowcharts of FIGS. 2-4, can be implemented in processing system 500. Various embodiments of the disclosure are described in terms of this example processing system 500. After reading this description, it will become apparent to a person of ordinary skill in the art how to implement the disclosure using other processing systems and/or architectures.

Processing system 500 includes one or more processors, such as processor 504. Processor 504 can be a special purpose or a general purpose processor. Processor 504 may be connected to a communication infrastructure 506 (for example, a bus or network) for communicating with other elements of the system. Processing system 500 also includes a main memory 508, such as a random access memory (RAM), and may also include a secondary memory 510, such as an EEPROM, which may be used for storing processor-executable code and other data, such as a digital signature, in a semi-permanent manner. Processor 504 reads from and/or writes to these memory units in a well-known manner.

Such processor-executable code, when executed, enable processing system 400 to implement exemplary embodiments of the present disclosure as discussed herein. In particular, the processor-executable programs, when executed, enable processor 504 to implement the processes of the present disclosure, such as the steps in the methods illustrated by flowcharts of FIGS. 2-4, but also, functionality directed the mobile device, monitoring server or authentication module.

In the preceding detailed description, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A user device for detecting an occurrence of an event comprising:
   a memory coupled to a processor, the memory configured to store a movement pattern signature of the user device indicative of a predefined movement pattern of the user device during the occurrence of the event; and
   a movement sensing module comprising sensor hardware, the movement sensing module configured to:
      capture a motion of the user device generated by a user of the user device, the captured motion including a change in rotation of the user device, a change in position of the user device, and a change in velocity of the user device;
      convert the captured motion into the movement pattern signature;
      store the movement pattern signature in the memory;
      monitor the user device for movement that matches the stored movement pattern signature; and
      in response to detecting that the monitored movement matches the stored movement pattern signature, wirelessly transmit a message to an external device indicating that the event has been detected and trigger a responsive action.

2. The user device of claim 1, wherein the movement pattern signature is enrolled in the memory by the user.

3. The user device of claim 1, wherein the movement pattern signature is selected by the user.

4. The user device of claim 1, wherein the movement pattern signature indicates movement of the user device.

5. A system for detecting and responding to an occurrence of an event, comprising:
   a user device including:
      a memory coupled to a processor, the memory configured to store a movement pattern signature of the user device indicative of a predefined movement pattern of the user device during the occurrence of the event,
      a movement sensing module comprising sensor hardware, the movement sensing module configured to:
         capture a motion of the user device generated by a user of the user device and convert the captured motion into the movement pattern signature;
         store the movement pattern signature in the memory;
         detect a change in rotation of the user device;
         detect a change in position of the user device;
         detect a change in velocity of the user device;
         determine, based on a combination of the change in rotation of the user device, the change in position of the user device, and the change in velocity of the user device, whether a movement of the user device matches the stored movement pattern signature; and
         wirelessly transmit a message indicating that the event has been detected in response to determining that the movement of the user device matches the stored movement pattern signature; and
      a monitoring server external to the user device configured to receive the message from the user device, and to perform a responsive action.

6. The system of claim 5, wherein the monitoring server is further configured to confirm occurrence of the event with the user device.

7. The system of claim 5, wherein the responsive action includes causing a set of cameras to monitor a location having the user device.

8. The user device of claim 1, wherein the movement sensing module is further configured to:
   capture the motion of the user device and convert the captured motion into the movement pattern signature during a signature enrollment process.

9. The user device of claim 8, wherein the movement pattern signature is generated by the user.

10. The user device of claim 8, wherein the motion of the user device comprises moving of the user device by the user in the movement pattern.

11. The user device of claim 1, wherein the user device is further configured to transmit a message confirming the occurrence of the event.

12. The user device of claim 1, wherein the user device is further configured to cause a set of cameras to monitor a location having the user device.

13. A computer-implemented method for detecting an occurrence of an event comprising:
   capturing, by at least one processor, a motion of a user device generated by a user of the user device, the captured motion including a change in rotation of the user device, a change in position of the user device, and a change in velocity of the user device;
   converting the captured motion into a movement pattern signature of the user device, the movement pattern signature indicating a predefined movement pattern of the user device to indicate the occurrence of the event;
   storing, by the at least one processor, the movement pattern signature of the user device in a memory;
   monitoring, by the at least one processor, the user device for movement that matches the stored movement pattern signature; and
      in response to detecting that the monitored movement matches the stored movement pattern signature, wirelessly transmitting, by the at least one processor, a message to an external device indicating that the event has been detected and triggering a responsive action.

14. The method of claim 13, wherein the user moves the user device in the movement pattern to generate the movement pattern signature.

15. The method of claim 13, further comprising:
   generating the movement pattern signature based on the motion of the user device during a signature enrollment process.

16. The method of claim 15, wherein the motion of the user device comprises moving of the user device by the user in the movement pattern.

17. The user device of claim 1, wherein the movement sensing module is further configured to detect movement of the user device in the movement pattern to indicate an occurrence of a security event.

18. The user device of claim 17, wherein the movement sensing module is further configured to trigger emergency assistance action in response to detecting the movement of the user device in the movement pattern indicating the occurrence of the security event.

19. The user device of claim 1, wherein the memory is further configured to store:
   movement pattern signatures for a plurality of movement patterns; and
   a condition indicator corresponding to each of the movement pattern signatures.

20. The user device of claim 1, wherein the movement sensing module is further configured to:
   determine, based on the movement pattern signature, a condition type of the event;

determine, based on the condition type, a condition type code corresponding to the condition type; and
transmit the condition type code to a server.

\* \* \* \* \*